United States Patent
Melin

(10) Patent No.: US 9,045,228 B2
(45) Date of Patent: Jun. 2, 2015

(54) ARRANGEMENT AT AN AIRCRAFT OF A DISPENSER UNIT FOR COUNTERMEASURES

(75) Inventor: Robert Melin, Sollentuna (SE)

(73) Assignee: SAAB AB, Linköping (SE)

( * ) Notice: Subject to any disclaimer, the term of this patent is extended or adjusted under 35 U.S.C. 154(b) by 985 days.

(21) Appl. No.: 13/144,962

(22) PCT Filed: Jan. 16, 2009

(86) PCT No.: PCT/SE2009/050041
§ 371 (c)(1),
(2), (4) Date: Oct. 11, 2011

(87) PCT Pub. No.: WO2010/082881
PCT Pub. Date: Jul. 22, 2010

(65) Prior Publication Data
US 2012/0018581 A1    Jan. 26, 2012

(51) Int. Cl.
*B64D 1/02* (2006.01)
*B64D 7/00* (2006.01)
*F41A 23/20* (2006.01)
*F42B 5/15* (2006.01)

(52) U.S. Cl.
CPC .. *B64D 1/02* (2013.01); *B64D 7/00* (2013.01); *F41A 23/20* (2013.01); *F42B 5/15* (2013.01)

(58) Field of Classification Search
CPC .............. B64D 1/02; B64D 1/08; B64D 1/10; B64D 1/18
USPC ................... 244/136, 137.4; 40/216; 89/1.51; 221/246
See application file for complete search history.

(56) References Cited

U.S. PATENT DOCUMENTS

| | | | |
|---|---|---|---|
| 1,364,569 A | | 1/1921 | McNulty |
| 2,505,950 A | * | 5/1950 | Dwyer et al. ................. 244/136 |
| 3,220,674 A | * | 11/1965 | Ordemann et al. ........... 244/136 |
| 3,430,533 A | | 3/1969 | Kifor et al. |
| 3,511,457 A | | 5/1970 | Pogue |
| 4,247,017 A | | 1/1981 | Guigan |
| 4,417,709 A | | 11/1983 | Fehrm |
| 5,631,441 A | | 5/1997 | Briere et al. |
| 5,663,518 A | | 9/1997 | Widmer |

(Continued)

FOREIGN PATENT DOCUMENTS

| DE | 2522927 B1 | 11/1976 |
|---|---|---|
| EP | 1194331 B1 | 5/2004 |

(Continued)

OTHER PUBLICATIONS

Office Action Issued May 20, 2013—In Counterpart U.S. Appl. No. 13/144,950.

(Continued)

*Primary Examiner* — Rob Swiatek
(74) *Attorney, Agent, or Firm* — Venable LLP; Eric J. Franklin

(57) ABSTRACT

An arrangement at an aircraft of a dispenser unit for countermeasures. The arrangement including a wall of an aircraft fuselage. A dispensing nozzle is arranged on the dispenser unit through which the countermeasures are dispensed. The dispenser unit is arranged within the aircraft fuselage. An aperture for dispensing the countermeasures is arranged in the wall of the aircraft fuselage. The aperture is arranged to substantially coincide with the dispensing nozzle.

12 Claims, 3 Drawing Sheets

(56) References Cited

U.S. PATENT DOCUMENTS

| | | | |
|---|---|---|---|
| 5,773,745 A | 6/1998 | Widmer | |
| 7,600,477 B2 | 10/2009 | Zatterqvist | |
| 8,033,225 B2 | 10/2011 | Friede et al. | |

FOREIGN PATENT DOCUMENTS

| | | | |
|---|---|---|---|
| EP | 1950522 A1 | 7/2008 | |
| FR | 2665875 A1 | 2/1992 | |
| GB | 2023263 A | 12/1979 | |
| WO | WO-02/093102 A1 | 11/2002 | |

OTHER PUBLICATIONS

PCT/ISA/210—International Search Report—Sep. 23, 2009.
PCT/ISA/237—Written Opinion of the International Searching Authority—Sep. 23, 2009.
PCT/IPEA.409—International Preliminary Report on Patentability—Apr. 1, 2011.

* cited by examiner

US 9,045,228 B2

ARRANGEMENT AT AN AIRCRAFT OF A DISPENSER UNIT FOR COUNTERMEASURES

CROSS-REFERENCE TO RELATED APPLICATIONS

This application is the national phase under 35 U.S.C. §371 of PCT/SE2009/050041 filed 16 Jan. 2009.

TECHNICAL FIELD

This invention relates to an arrangement at an aircraft of a dispenser unit for countermeasures.

BACKGROUND ART

Dispenser units arranged to dispense countermeasures from aircraft are well known. Both fighter and transport aircraft, as well as civil aircraft are exposed to threats from self-guided missiles equipped with radar, IR or laser sensors, which can be fired either from other aircraft or from the ground. In order to protect the threatened aircraft from an attack of such missiles they are provided with various types of dispenser units which dispense countermeasure means. Such countermeasure means may comprise aluminized foil or fibers, hot IR chaff, and also laser-reflecting fibers or foils, which confuse and divert missiles aimed at the aircraft.

The dispenser units are often enclosed in capsules or cases arranged under the wings or under the fuselage of the aircraft. These capsules and cases increase the air drag of the aircraft. The increased air drag results in a decreased maximum speed of the aircraft and also increased fuel consumption. Also the maneuverability of the aircraft may be decreased.

Document WO-A1-02/093102 discloses a dispenser intended for discharging countermeasure means. The dispenser is built into a modified rocket capsule which is intended for originally unguided attack rockets. The capsule may be arranged under the wings of the aircraft or under the aircraft fuselage and will therefore have an influence on the air drag of the aircraft.

Another prior art arrangement for a dispenser unit is disclosed in EP-B1-1194331. The dispenser unit is arranged within a cover on the upper side of the wing or on the outside of the aircraft fuselage. Also this placement of the cover will have an influence on the air drag of the aircraft.

The objective problem to be solved by the present invention is to arrange a dispenser unit at an aircraft so that the air drag is minimized.

Another objective problem to be solved by the present invention is to arrange a dispenser unit within an aircraft, so that a magazine for countermeasures arranged at the dispenser unit is easy to replace.

A further objective problem to be solved by the present invention is to arrange a magazine for countermeasures at a dispenser unit, in such a way that the magazine is easy to replace.

A further objective problem to be solved by the present invention is to arrange a dispenser unit in a very limited space.

SUMMARY OF THE INVENTION

This is achieved by an arrangement at an aircraft of a dispenser unit for countermeasures.

Such an arrangement provides for a minimized air drag, because of the small or non-existent exposure of the dispenser unit on the outside of the aircraft fuselage.

According to an embodiment of the invention the hatch covers an opening in the wall of the aircraft fuselage through which opening the magazine for counter measures is replaceable. By such an opening in the wall of the aircraft fuselage the magazine can easily and quickly be replaced by a magazine loaded with countermeasures.

According to a further embodiment of the invention the magazine for countermeasures is connected to the dispenser unit with snap fastener means, such as latches. When using snap fastener means the magazine can easily and quickly be replaced by a magazine loaded with countermeasures.

According to a further embodiment of the invention the control unit is connected to the dispenser unit and the control unit is arranged at a distance from the dispenser unit. Such an arrangement of the control unit makes it possible to arrange the dispenser unit in a very limited space.

BRIEF DESCRIPTION OF THE DRAWINGS

Further advantages and features of the invention can be derived from the following detailed description of exemplary embodiments of the invention, with reference to the drawings.

DETAILED DESCRIPTION

Figure 1:
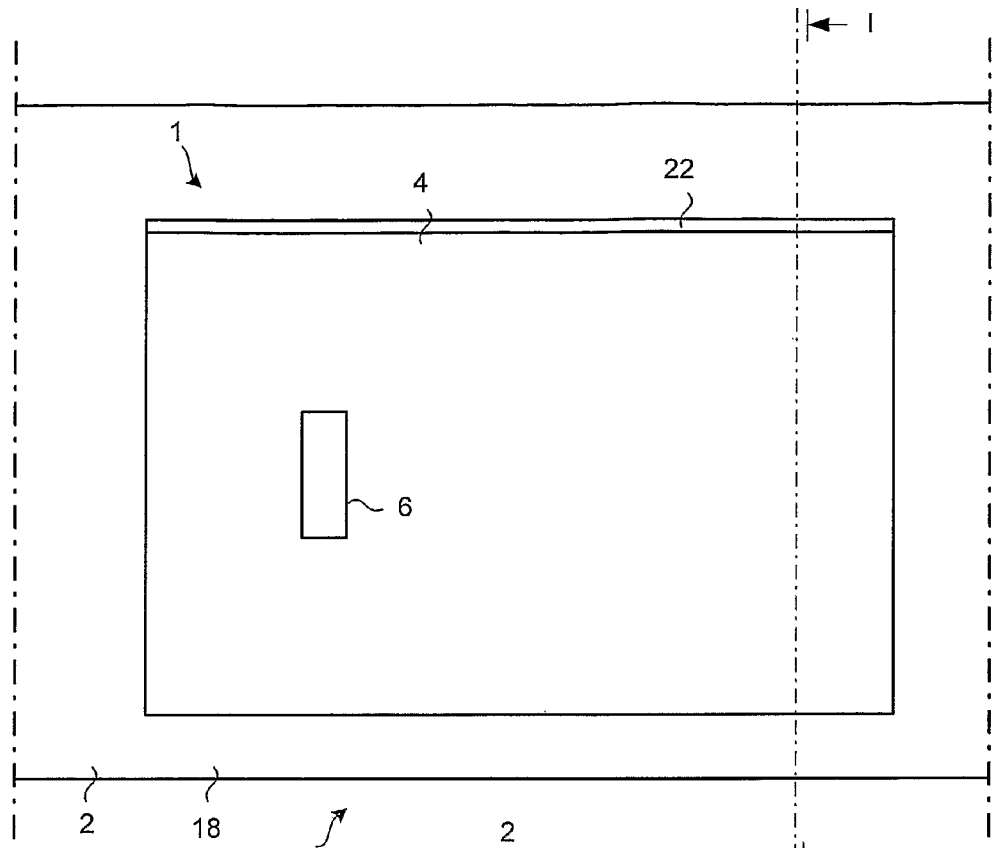
FIG. 1 is a side view of an aircraft fuselage provided with a hatch and aperture according to the invention.
Figure 2:
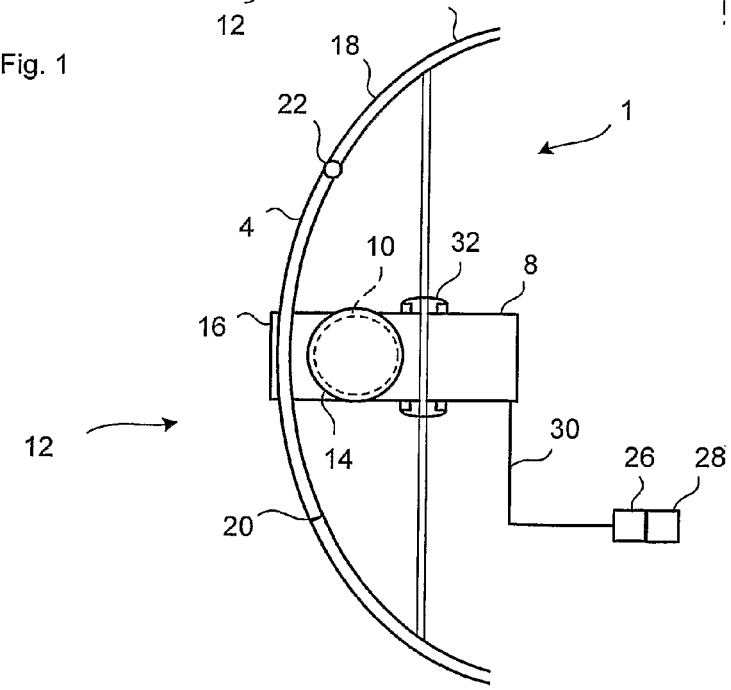
FIG. 2 is a cross section view of along line I-I in FIG. 1.

In FIGS. 1 and 2 the arrangement 1 according to the invention is disclosed. FIG. 1 is a side view of an aircraft fuselage 2 provided with a hatch 4 and aperture 6 according to the invention. FIG. 2 is a cross-sectional view along line I-I in FIG. 1. The arrangement 1 comprises a dispenser unit 8 which is designed to dispense countermeasures 10, such as decoys from an aircraft 12. The aircraft 12 can be a fighter or a transport aircraft, as well as a civil aircraft, which may be exposed to threats from self-guided missiles equipped with radar, IR or laser sensors. Such missiles can be fired either from other aircrafts or from the ground.

In order to protect a threatened aircraft from an attack of such missiles the dispenser unit 8 dispenses countermeasure means. The countermeasure means may comprise aluminized foil or fibers, hot IR chaff, and also laser-reflecting fibers or foils, which confuse and divert missiles aimed at the aircraft.

The dispenser unit 8 is provided with a magazine 14 for the countermeasures 10 and a dispensing nozzle 16 through which the countermeasures 10 are dispensed or ejected. The countermeasures 10 may be ejected by any suitable means within the dispensing unit, such as an ejecting piston, an explosive charge or a pressurized gas.

The dispenser unit 8 is arranged within the aircraft fuselage 2 and an aperture 6 for dispensing the countermeasures 10 is arranged in the outer wall 18 of the aircraft fuselage 2. The aperture 6 is arranged to substantially coincide with the dispensing nozzle 16. Preferably the aperture 6 has a substantially similar form and size as the dispensing nozzle 16. The hatch 4 covers an opening 20 in the wall 18 of the aircraft fuselage 2. The aperture 6 is arranged in the hatch 4, so when the hatch 4 is closed and covers the opening 20 the aperture 6 coincides with the dispensing nozzle 16. The hatch 4 is movably connected to the wall 18 of the aircraft fuselage 2 by one or several hinges 22.

In FIGS. 1 and 2 the hatch 4 is closed and covers the opening 20. The dispensing nozzle 16 is arranged in the aperture 6 so that the nozzle 16 is substantially aligned with the outer surface of the wall 18 of the aircraft fuselage 2, so that the aircraft drag is minimized. The aperture 6 is arranged at a place in the wall 18 of the aircraft fuselage 2, so that the countermeasures 10 are dispensed substantially perpendicular to the main flight direction of the aircraft 12. Therefore, the main flight direction of the aircraft 12 according to the figures is substantially out of the cross section view of the aircraft fuselage 2 in FIG. 2. When dispensing the countermeasures 10 substantially perpendicular to the main flight direction the air flow will influence on how the countermeasures 10 release foils or fibers or develop into flames if the countermeasures 10 are hot IR chaff.

A substantially vertical bracket 24 is arranged within the aircraft fuselage 2 and the dispenser unit 8 is mounted on the bracket 24. With such a vertical bracket 24 the dispenser unit 8 is simply arranged and attached in the aircraft 12. Therefore, there is no need of a complicated framework to attach the dispenser unit 8 within the aircraft fuselage 2.

A control unit 26 which comprises a power supply is connected to the dispenser unit 8. In order to increase the flexibility of mounting the dispenser unit 8 within the aircraft fuselage 2 it is preferably possible to arrange the control unit 26 and the power supply unit 28 at a distance from the dispenser unit 8. The control unit 26 and the power supply unit 28 are connected to the dispenser unit 8 by electrical cables 30. It is also possible to arrange the control unit 26 and the power supply unit 28 as two separate units.

Figure 3:
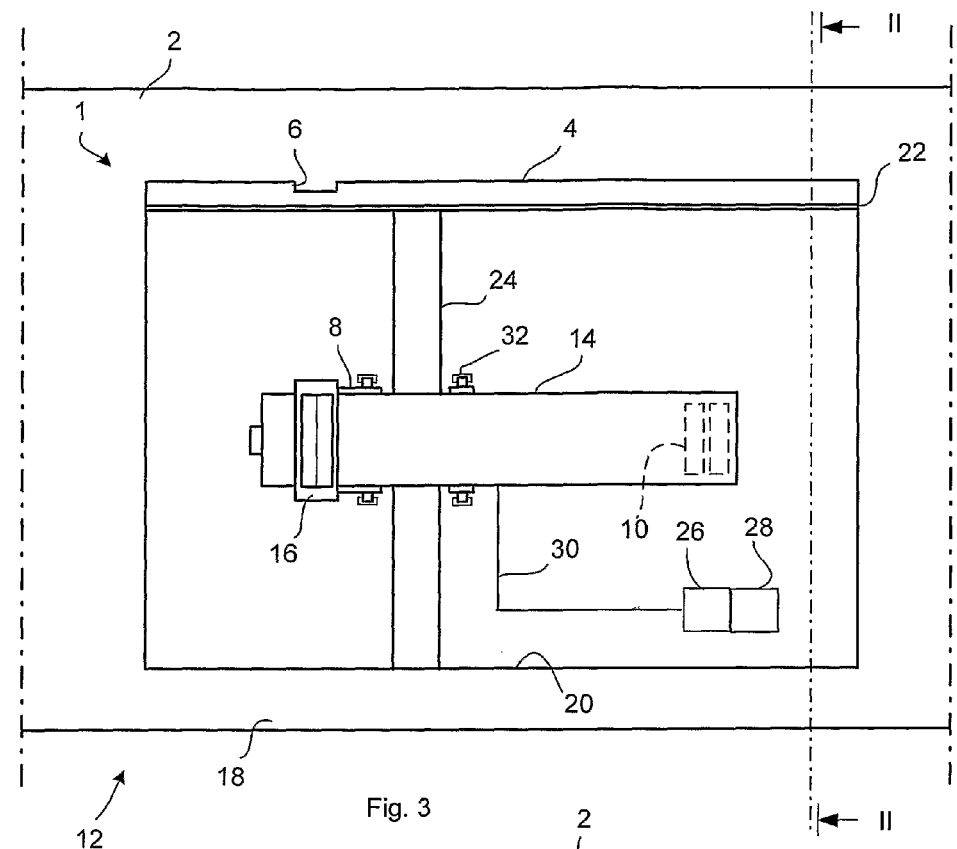
FIG. 3 is a side view of the aircraft fuselage with an opened hatch.
Figure 4:
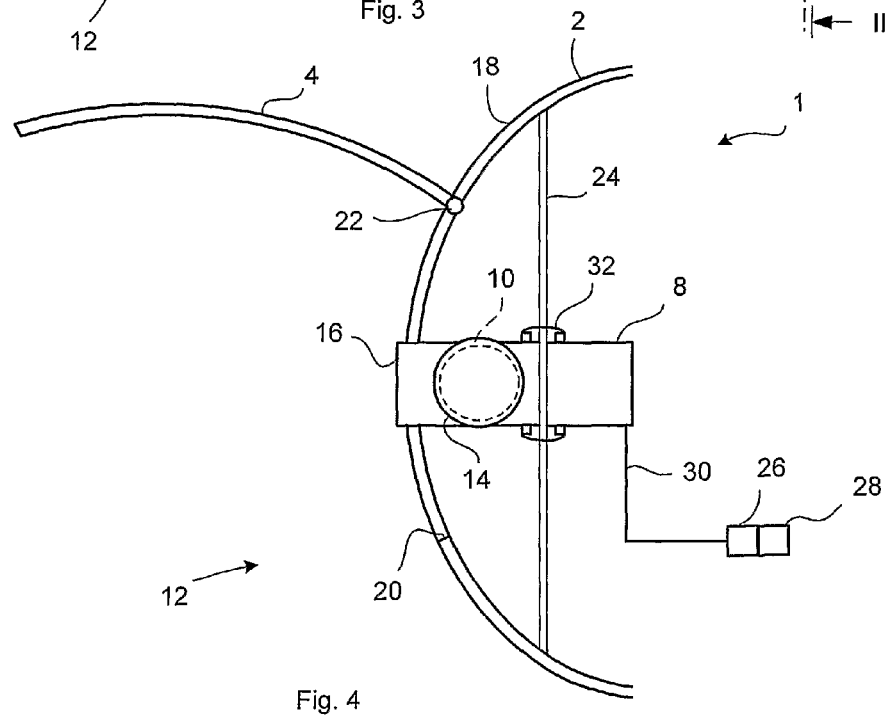
FIG. 4 is a cross section view along line II-II in FIG. 3.

In FIGS. 3 and 4 the hatch 4 is in an opened position. FIG. 3 is a side view of the aircraft fuselage 2 with an opened hatch 4. FIG. 4 is a cross section view along line II-II in FIG. 3 The opening 20 in the wall 18 of the aircraft fuselage 2 has a form and size which substantially is adapted to the form and size of the magazine 14 for the countermeasures 10, so that is possible to replace the magazine 14 through the opening 20 in the wall 18. Thus, with such an opening 20 in the wall 18 of the aircraft fuselage 2 the magazine 14 can easily and quickly be replaced by a magazine 14 loaded with countermeasures 10. Preferably the magazine 14 for countermeasures 10 is connected to the dispenser unit 8 with snap fastener means 32, such as latches. In FIG. 3 the magazine 14 is connected to the dispensing unit with four latches. When using snap fastener means 32 the magazine 14 can easily and quickly be replaced by a magazine 14 loaded with countermeasures 10.

Figure 5:
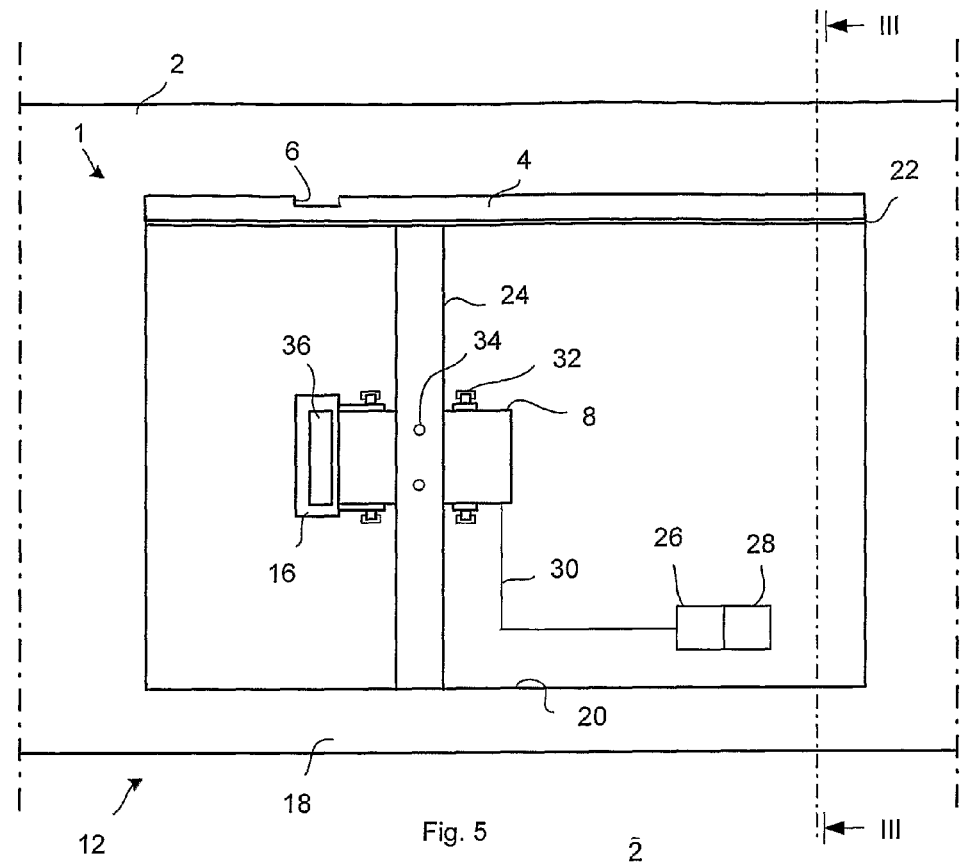
FIG. 5 is a side view of the aircraft fuselage disclosing a removed magazine for the countermeasures.
Figure 6:
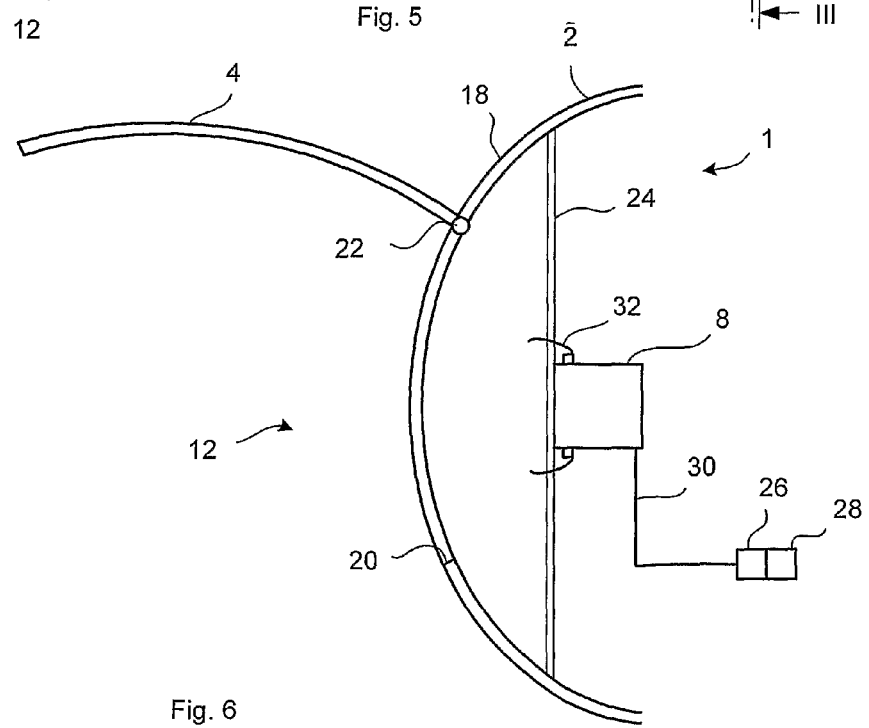
FIG. 6 is a cross section view along line III-III in FIG. 5.

FIGS. 5 and 6 disclose the arrangement 1 according to the present invention when the magazine 14 is removed from the dispenser unit 8. FIG. 5 is a side view of the aircraft fuselage 2 disclosing a removed magazine 14 for the countermeasures 10. FIG. 6 is a cross section view along line III-III in FIG. 5. Before removing the magazine 14 the hatch 4 is opened and the latches are unlocked and released from the magazine 14. Thereafter the magazine 14 is removed from the dispenser unit 8 and out of the opening 20. Arranging a new or loaded magazine 14 at the dispenser unit 8 is performed in the opposite order. In FIG. 5 is disclosed how the dispensing unit is attached on the bracket 24 using two bolts 34. When the dispenser unit 8 must be removed from the aircraft 12 due to service and maintenance the dispenser unit 8 is released from the bracket 24 by unscrew the bolts 34.

Also disclosed in FIG. 5 is an ejecting opening 36 in the dispensing unit, which ejecting opening 36 communicates with the magazine 14 when mounted on the dispensing unit.

In the ejecting opening 36 an ejecting piston (not disclosed) is arranged, which ejects the countermeasures 10 from the magazine 14 out through the dispensing nozzle 16.

In order to increase the effect of confusing incoming missiles aimed at the aircraft 12 several dispenser units 8 may be arranged on the same aircraft 12. Thus, the arrangement 1 according to the present invention is preferably installed on both sides of the aircraft 12. Also, several arrangements 1 according to the invention may be installed on the same side of the aircraft 12.

The arrangement 1 according to the present invention is suitable to install in aircrafts 12 which from the beginning not were designed with a countermeasure arrangement 1, such as civil aircrafts for transporting people. The space within such aircrafts is often optimized and therefore it is difficult to find enough space to install a countermeasure arrangement 1. However, the arrangement 1 according to the present invention may be installed in a defined space adjacent the outer wall 18 of the aircraft 12 fuselage 2. As mentioned above, the control and power supply unit 28 can be arranged at a distance from the dispenser unit 8. Therefore, if the space where the dispenser unit 8 is installed cannot accommodate also the control and power supply unit 28 these units can be installed in another space within the aircraft fuselage 2.

The invention claimed is:

1. An arrangement at an aircraft of a dispenser unit for countermeasures, the dispenser unit being arranged within an aircraft fuselage, the arrangement comprising:
    a wall of the aircraft fuselage, said wall comprising an opening,
    an openable hatch arranged to cover the opening in the aircraft fuselage when the hatch is in a closed position, the hatch comprising an aperture, and
    a dispensing nozzle arranged on the dispenser unit, wherein the aperture in the hatch is arranged to substantially coincide with the dispensing nozzle through which the countermeasures are dispensed when the hatch is in the closed position.

2. The arrangement according to claim 1, wherein the wall of the aircraft fuselage, in which the aperture is arranged, extends in a direction such that a normal to the direction is substantially perpendicular to a forward flight direction of the aircraft.

3. The arrangement according to claim 1, wherein the aperture and the dispenser nozzle are arranged such that the countermeasures are dispensed substantially perpendicular to the forward flight direction of the aircraft.

4. The arrangement according to claim 1, wherein the dispensing nozzle is arranged in the aperture so that the nozzle is substantially aligned with an outer surface of the wall of the aircraft fuselage, so that a drag of the aircraft is minimized.

5. The arrangement according to claim 1, wherein the hatch is movably connected to the wall of the aircraft fuselage by at least one hinge.

6. The arrangement according to claim 5, wherein a magazine for countermeasures, arranged on the dispenser unit, is replaceable through the opening in the fuselage.

7. The arrangement according to claim 6, wherein the magazine for countermeasures is connected to the dispenser unit with a snap fastener.

8. The arrangement according to claim 7, wherein the snap fastener comprises at least one latch.

9. The arrangement according to claim 1, further comprising:
    a bracket for the dispenser unit arranged within the aircraft fuselage.

10. The arrangement according to claim 9, wherein the bracket is substantially vertically arranged within the aircraft fuselage and wherein the dispenser unit is mounted on the bracket.

11. The arrangement according to claim 1, further comprising:
 a control unit connected to the dispenser unit, wherein the control unit is arranged at a distance from the dispenser unit.

12. The arrangement according to claim 11, wherein the control unit comprises a power supply unit.

* * * * *